US010697316B2

(12) United States Patent
Boyd

(10) Patent No.: US 10,697,316 B2
(45) Date of Patent: Jun. 30, 2020

(54) APPARATUS AND METHOD FOR MEASURING TURBINE TEMPERATURE

(71) Applicant: Rolls-Royce North American Technologies Inc., Indianapolis, IN (US)

(72) Inventor: Douglas Boyd, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 269 days.

(21) Appl. No.: 15/845,474

(22) Filed: Dec. 18, 2017

(65) Prior Publication Data
US 2019/0186283 A1 Jun. 20, 2019

(51) Int. Cl.
G01K 13/08 (2006.01)
F01D 17/08 (2006.01)
F02C 9/00 (2006.01)
G01K 13/00 (2006.01)
G01K 13/02 (2006.01)
F02C 9/28 (2006.01)

(52) U.S. Cl.
CPC ............. F01D 17/085 (2013.01); F02C 9/00 (2013.01); F02C 9/28 (2013.01); G01K 13/00 (2013.01); G01K 13/02 (2013.01); F05D 2220/32 (2013.01); F05D 2270/112 (2013.01); F05D 2270/303 (2013.01); F05D 2270/80 (2013.01); G01K 2013/024 (2013.01); G01K 2205/00 (2013.01); G01K 2213/00 (2013.01)

(58) Field of Classification Search
CPC .. G01K 13/02; G01K 2013/024; G01K 13/00; G01K 13/08; G01K 1/16; G01M 15/14
See application file for complete search history.

(56) References Cited

U.S. PATENT DOCUMENTS

| 3,348,414 | A |   | 10/1967 | Waters et al. |           |
|-----------|---|---|---------|---------------|-----------|
| 3,483,750 | A | * | 12/1969 | Pratt ......................  | G01K 13/02 |
|           |   |   |         |               | 374/116   |
| 3,509,768 | A | * | 5/1970  | Tucker ...................  | G01K 7/021 |
|           |   |   |         |               | 374/115   |
| 3,618,386 | A | * | 11/1971 | Black .....................  | G01K 11/22 |
|           |   |   |         |               | 374/115   |

(Continued)

FOREIGN PATENT DOCUMENTS

| CN | 105300695 A | * | 2/2016 |
| JP | 60166815 A  | * | 8/1985 |
| JP | 360166815 A | * | 8/1985 |

Primary Examiner — Gail Kaplan Verbitsky
(74) Attorney, Agent, or Firm — Brinks Gilson & Lione

(57) ABSTRACT

A temperature sensing device for a turbine of an engine and a method for measuring the temperature of the turbine are disclosed. The turbine includes a turbine stage coupled to a rotatable shaft and an outer casing. First and second sensor holders are disposed between the rotatable shaft and the outer casing, and first and second temperature sensors disposed on the first and second sensor holders, respectively. Each of the first and second sensor holders has only one temperature sensor disposed thereon, the first and second temperature sensors are disposed at first and second distances from the rotatable shaft respectively, and the first and second distances are different.

18 Claims, 6 Drawing Sheets

(56) References Cited

U.S. PATENT DOCUMENTS

| | | | | |
|---|---|---|---|---|
| 4,580,910 A * | 4/1986 | Corwin | G01K 1/14 | 374/115 |
| 4,934,137 A | 6/1990 | MacKay | | |
| 4,970,670 A * | 11/1990 | Twerdochlib | G01K 1/20 | 374/163 |
| 5,106,203 A | 4/1992 | Napoli et al. | | |
| 5,306,088 A * | 4/1994 | Zoerner | F16C 33/06 | 356/43 |
| 5,784,894 A * | 7/1998 | Army, Jr. | F24F 5/0085 | 62/402 |
| 5,878,566 A * | 3/1999 | Endo | F23N 5/003 | 60/773 |
| 6,805,483 B2 * | 10/2004 | Tomlinson | F23N 5/003 | 374/144 |
| 6,875,007 B2 * | 4/2005 | Pettit | F23G 5/46 | 431/170 |
| 7,004,622 B2 * | 2/2006 | Hardwicke | G01K 1/14 | 374/141 |
| 7,013,718 B2 * | 3/2006 | Ingistov | F01D 17/02 | 374/141 |
| 8,033,719 B2 * | 10/2011 | Beutin | F01D 17/08 | 374/158 |
| 8,965,728 B2 | 2/2015 | Snider et al. | | |
| 9,207,128 B2 | 12/2015 | McCarthy et al. | | |
| 2004/0114665 A1 * | 6/2004 | Park | G01K 1/026 | 374/179 |
| 2008/0291964 A1 * | 11/2008 | Shrimpling | F01D 17/085 | 374/1 |
| 2012/0150413 A1 * | 6/2012 | Bunce | F02C 9/28 | 701/100 |
| 2013/0051426 A1 * | 2/2013 | Gaully | F01D 17/085 | 374/144 |
| 2015/0000303 A1 * | 1/2015 | Hockaday | F02C 7/32 | 60/784 |
| 2015/0063411 A1 * | 3/2015 | DeSilva | G01K 11/24 | 374/119 |

* cited by examiner

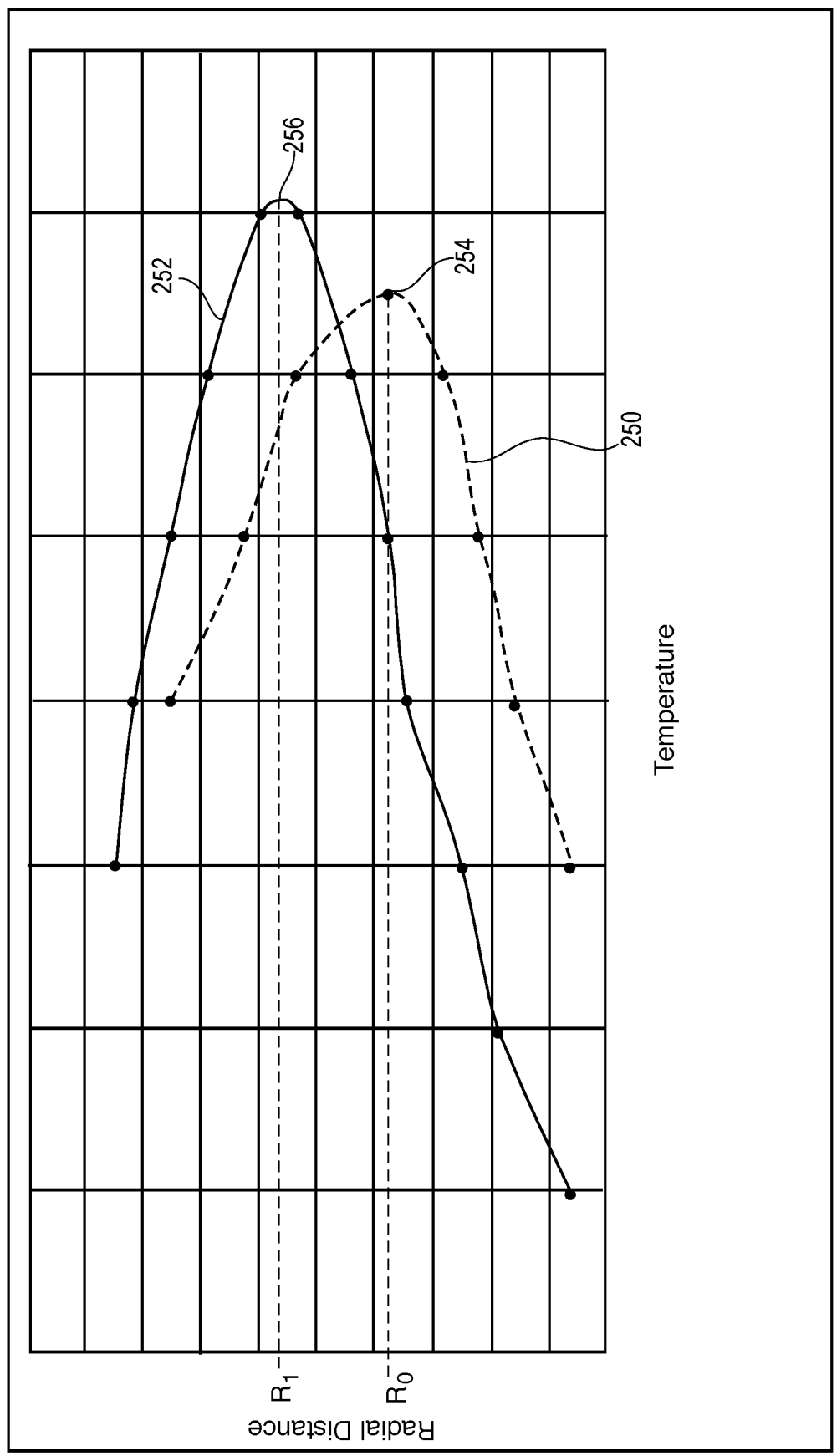

APPARATUS AND METHOD FOR MEASURING TURBINE TEMPERATURE

CROSS REFERENCE TO RELATED APPLICATIONS

Not applicable

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to turbine engines, and more particularly, to an apparatus and method for measuring the temperature of exhaust exiting a turbine engine.

BACKGROUND

A gas turbine engine, for example, a turbofan jet engine, includes a fan coupled to a rotatable shaft. As the fan rotates, ambient air is drawn into the engine through an inlet thereof. A portion of the drawn air passes through a bypass flow path and escapes through an exhaust port of the engine and creates thrust that propels a vehicle. Another portion of the drawn air is directed through one or more compressors that compress and pressurize the air. The compressed air is directed to a combustor in which the compressed air is combined with a fuel and ignited. Such ignition causes combustion of the fuel and the compressed air, and produces rapidly expanding gasses. The gasses pass through a turbine that includes one or more turbine stages coupled to the shaft, and are exhausted through the exhaust port. The gasses rotate the turbine stages, which then causes the shaft to rotate. Rotation of the shaft rotates the fan to draw in more ambient air into the inlet port of the engine.

Temperature sensors may be disposed in the turbine to measure the temperature of the gasses passing therethrough. A controller monitors such temperature measurements during operation of the gas turbine engine to adjust operation of the compressors and/or combustor so to ensure the engine operates efficiently and to reduce risk of engine damage, for example, from overheating.

During development, temperature rakes, each rake having multiple sensors along the length thereof, may be distributed circumferentially about the shaft in the turbine. Temperatures acquired from the sensors in these rakes during testing of the engine can be used to monitor temperature at various points in the turbine, both radially and circumferentially, when the engine is operated under different conditions. Such detailed temperature monitoring can be used to manages engine operation so that the engine operates efficiently and within acceptable temperature ranges. The detailed temperature monitoring using rakes can also be used to develop a profile of how the temperature distribution varies in the turbine under different operating conditions of the engine.

However, the use of temperature rakes in a production engine is not feasible because it increases the costs and complexity of the turbine temperature monitoring system. Instead, one or more temperature sensors are distributed circumferentially about a portion of the rotatable shaft in the turbine, each temperature sensor placed at predetermined radial distance from the shaft. Such predetermined distance may be, for example, halfway between the shaft and a casing that surrounds the turbine.

SUMMARY

According to one aspect, a temperature sensing device for measuring temperature in a turbine of an engine having a turbine stage coupled to a rotatable shaft and an outer casing, includes first and second sensor holders disposed between the rotatable shaft and the outer casing, a first temperature sensor disposed on the first sensor holder at a first radial distance from the rotatable shaft, and a second temperature sensor disposed on the second sensor holder at a second radial distance from the rotatable shaft. Each of the first and second sensor holders has only one temperature sensor disposed thereon, and the first and second distances are different.

According to another aspect, a method of measuring temperatures in a turbine of an engine having a turbine stage coupled to a rotatable shaft and an outer casing, includes the steps of disposing first and second sensor holders between the rotatable shaft and the outer casing, disposing only a first temperature sensor on the first sensor holder at a first distance from the rotatable shaft, disposing only a second temperature sensor on the second sensor holder at a second distance from the rotatable shaft, and wherein the first and second distances are different.

Other aspects and advantages will become apparent upon consideration of the following detailed description and the attached drawings wherein like numerals designate like structures throughout the specification.

BRIEF DESCRIPTION OF THE DRAWINGS

FIG. 6 is a graph that shows a relationship between radial distance and temperature of two operating modes of the turbofan engine of FIG. 1.

DETAILED DESCRIPTION

Figure 1:
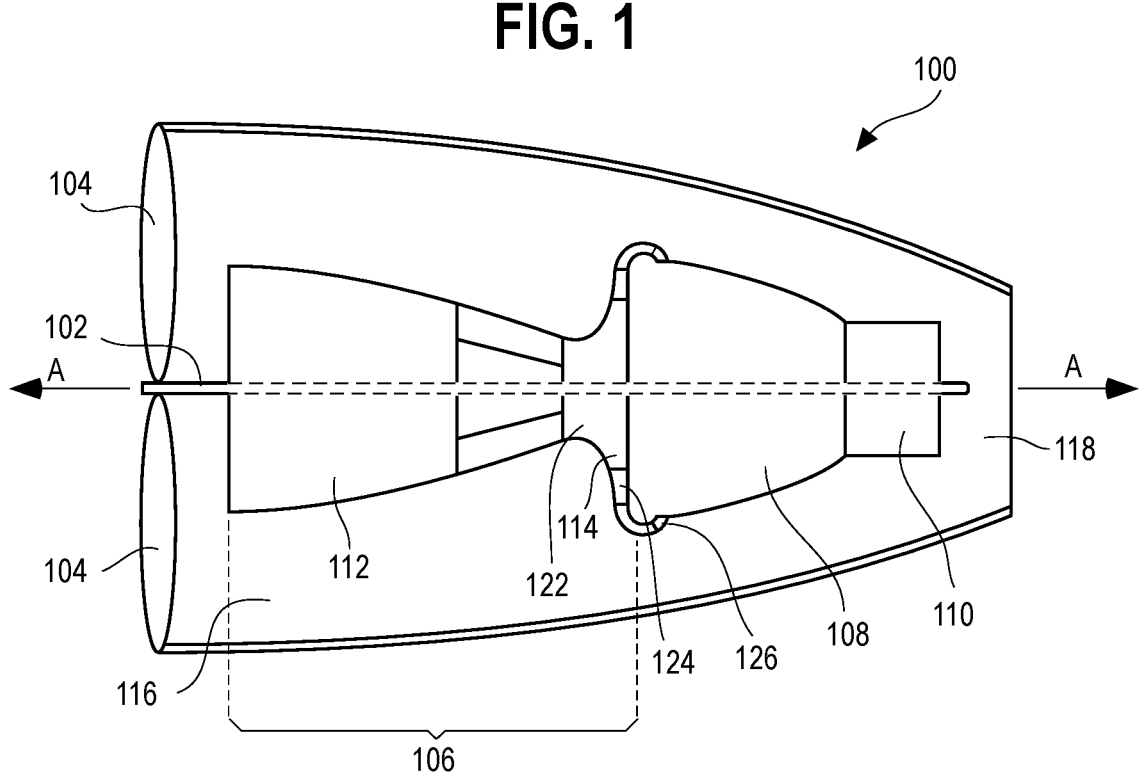
FIG. 1 is a cross-sectional view of an exemplary turbofan engine.

Referring to FIG. 1, an engine 100 includes a shaft 102, a fan 104, a compressor 106, a combustor 108, and a turbine 110. The compressor 106 includes an axial compressor 112 and a centrifugal compressor 114.

The turbine 110 is coupled to the shaft 102 so that rotation of the turbine 110 causes rotation of the shaft 102. In some embodiments, the axial compressor 112 and the centrifugal compressor 114 are all also coupled to and driven by the shaft 102 such that, when the shaft 102 rotates, both compressors 112, 114 rotate at the same speed as the shaft 102 and the turbine 110. In other embodiments, the fan 104, the axial compressor 112, and the centrifugal compressor 114 are coupled to one or more other shafts (not shown), which in turn are driven by the shaft 102. In these embodiments, one or more of the fan 104, the axial compressor 112, and the centrifugal compressor 114 may rotate at speeds different from one another and different than the shaft 102.

When the fan 104 rotates, air is drawn into the engine 100. A portion of the drawn air passes through a bypass flow path 116 to an output port 118 of the engine 100, and thereby generates thrust.

Another portion of the drawn air is directed through the axial compressor 112, and compressed air from the axial compressor 112 is passed into the centrifugal compressor 114.

The centrifugal compressor 114 includes an impeller 122, a diffuser 124, and one or more de-swirl vanes 126. Compressed air enters the impeller 122, passes through the diffuser 124 and the de-swirl vanes 126 and into the combustor 108. The compressed air is combined with a fuel in the combustor 108 and burned to produce rapidly expanding combustion gasses. The combustion gasses pass through and rotate the turbine 110. Because the turbine 110 is coupled to the shaft 102, rotation of the turbine 110 causes rotation of the shaft 102, and thereby rotation of the fan 104 to draw in more air. After passing through the turbine 110, the combustion gasses are exhausted through the output port 118 and provide additional thrust.

Figure 2:
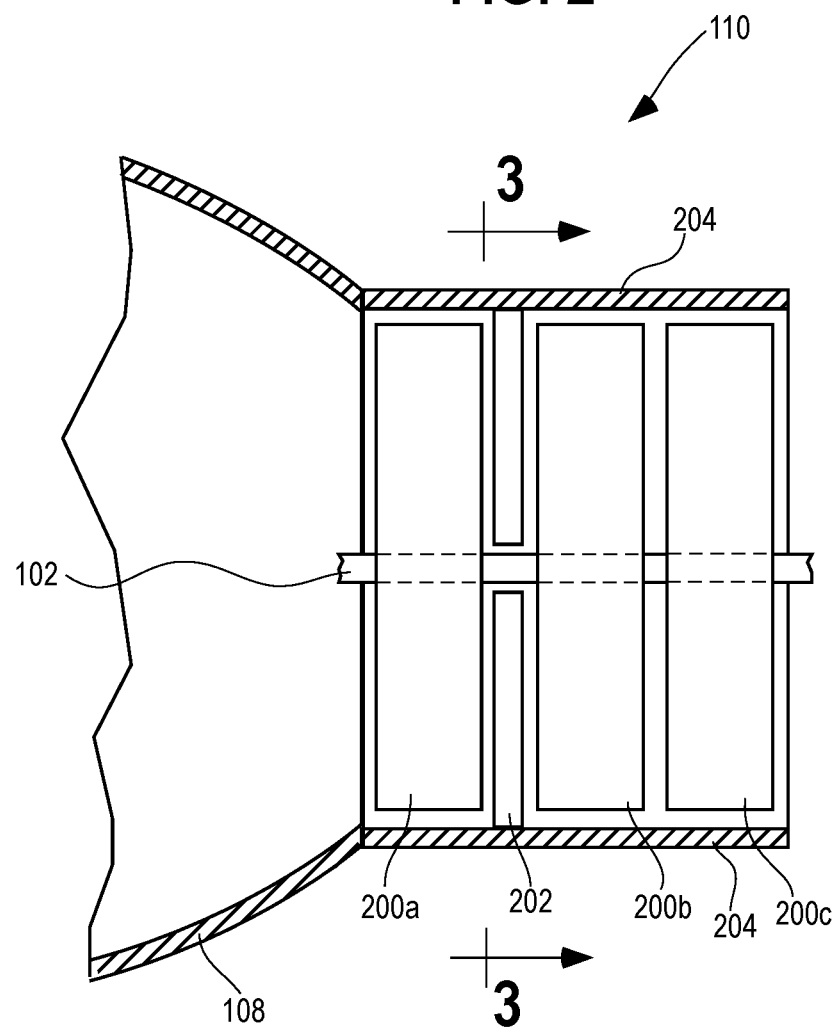
FIG. 2 is a cross-sectional fragmentary view of a turbine of the engine of FIG. 1, with a portion of the turbine in side elevational view.

Referring to FIG. 2, the turbine 110 includes one or more turbine stages 200. The turbine 110 illustrated in FIG. 2 includes three substantially identical turbine stages 200a, 200b, and 200c. However, it should be apparent the other embodiments may have more or fewer such stages, and that such stages may be substantially identical to one another or may differ from one another. In some embodiments, one or more of the turbine stages 200 is/are a high-pressure turbine stage(s) and the remainder is/are a low-pressure turbine stage(s). In some embodiments, turbine stage 200a nearest the combustor 108 is a high-pressure turbine stage and the turbine stage 200b further away from the combustor relative to the turbine stage 200a is a low-pressure turbine stage. Each turbine stage 200 is secured to the shaft 102 and includes a plurality of blades radiating outwardly away from the shaft.

As described above, combustion gasses generated in the combustor 108 serially pass through each turbine stage and cause such stage to rotate, and such rotation causes rotation of the shaft.

Disposed between, for example, the turbine stage 200a nearest the combustor 108 and the next nearest turbine stage 200b is a temperature sensing device 202. The temperature sensing device 202 may be disposed between any two turbine stages 200, or even following the turbine stage 200c farthest from the combustor 108. Further, one or more additional temperature sending devices 202 may be disposed between other pairs of turbine stages 200. Typically, the combustion gases that enter the turbine 100 are too hot when such gasses reach the most upstream turbine stage 200a, and it may not be feasible to dispose a temperature sensor 202 between the combustor 108 and the turbine stage 200a nearest to the combustor 108. However, it should be apparent that if components of temperature sensing device 202 described herein are identified that can operate in the high temperatures between the combustor 108 and the turbine stage 200a nearest thereto, then a temperature sensing device 202 including such components may be disposed in such position.

Surrounding the turbine stages 200 and the temperature sensing device 202 is a casing 204. In some embodiments, the temperature sensing device 202 is secured to the casing 204 so that the temperature sensing device 202 remains static even as the turbine stages 200 and the shaft 102 rotate.

Figure 3:
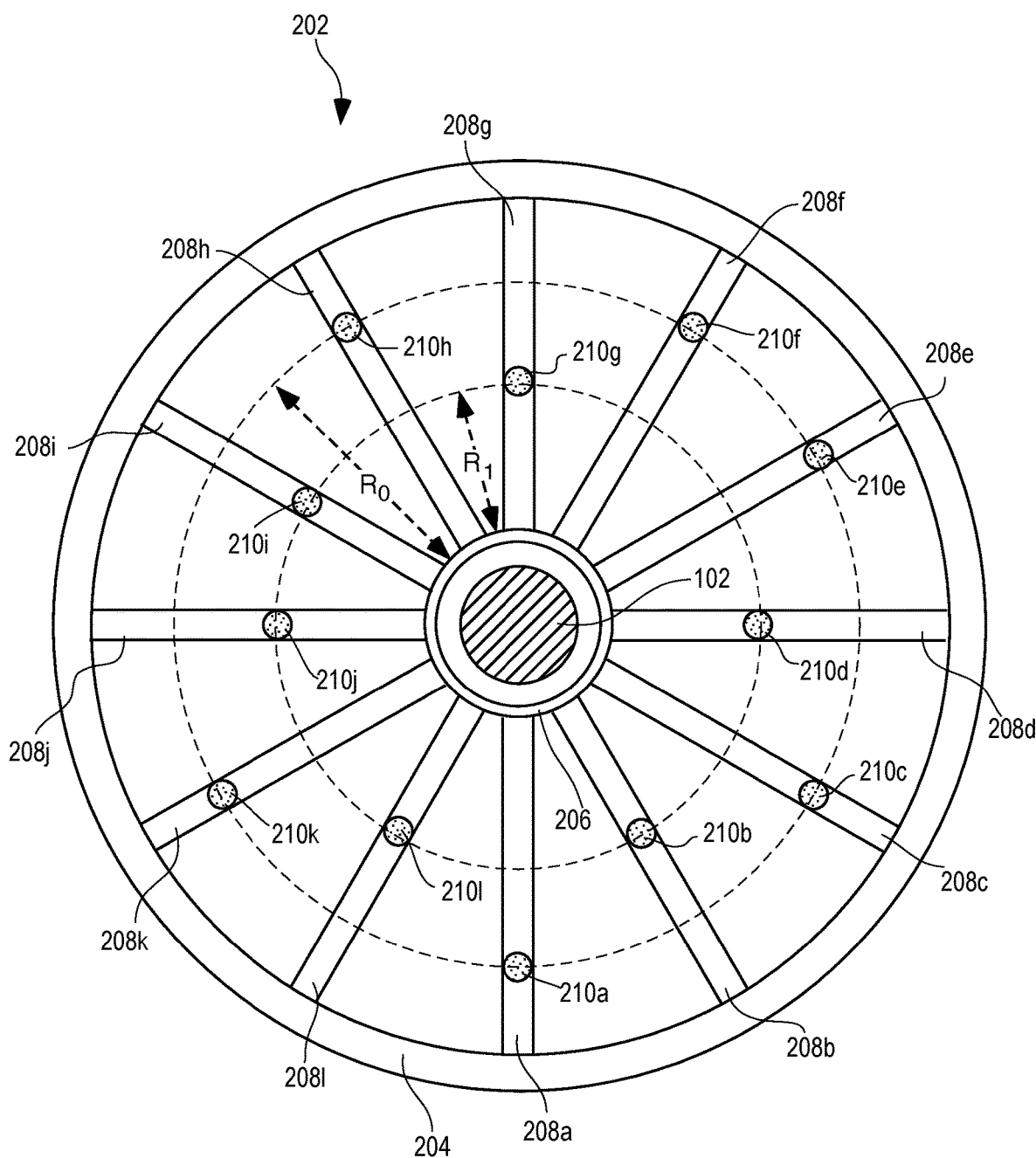
FIG. 3 is a cross-sectional view of portions of an embodiment of a temperature sensing device of FIG. 2 taken along the line 3-3 of FIG. 2 and that shows an arrangement of sensor holders and temperature sensors that comprises such temperature sensing device.

Referring to FIG. 3, in one embodiment, the temperature sensing device 202 includes a central ring 206, and a plurality of sensor holders 208 secured to the central ring 206. The sensor holder 208 may be a strut, a vane, or any other structure disposed between the shaft 102 and the casing 204 that facilitates disposing the temperature sensing device 202 at a particular radial distance from the shaft 102. Further, each sensor holder 208 is disposed such that at most one temperature sensing device 202 is disposed at a particular circumferential angle about the shaft 102. In some embodiments, the sensor holder 208 radiates outward from the central ring 206 and is secured to the turbine casing 204.

In some embodiments, each sensor holder 208 has a temperature sensor 210 secured thereto. In other embodiments, selected sensor holders 208 have a temperature sensor 210 secured thereto and other sensor holders 208 are free of a temperature sensor 210. In an exemplary embodiment, each sensor holder 208 of the temperature sensing device 202 has at most one temperature sensor 210 secured thereto. The temperature sensor 210 may be, for example, a thermocouple, a thermistor, or any other suitable temperature sensor apparent to one who has skill in the art.

Each temperature sensor 210 is electrically connected to a controller (not shown) that monitors the ambient temperature sensed thereby. The temperature sensor 210 generates an electrical signal having a characteristic such as, for example, a current that varies in accordance with an ambient temperature where the sensor 210 is disposed. In the turbine 110, such ambient temperature is substantially the temperature of the gasses from the combustor passing therethrough that reach the temperature sensing device 202. The controller may be, for example, an engine controller that controls the operation of other components of the engine such as the compressor 106 (FIG. 1) and the combustor (108). The controller monitors the characteristic of the signal generated by the temperature sensors 210, determines temperatures associated with such signals, analyzes such temperatures, and if necessary adjusts operation of the compressor 106 and the combustor 108 in accordance with such analysis.

Referring once again to FIG. 3, the temperature sensors 210 are disposed at different radial distances from the central ring 206. For example, the temperature sensors 210a, 210c, 210e, 210f, 210h, and 210k are disposed on the sensor holders 210a, 210c, 210e, 210f, 210h, and 210k respectively, at a radial distance $R_0$ from the central ring 206. The temperature sensors 210b, 210d, 210g, 210i, 210j, and 210l are disposed on the sensor holders 210b, 210d, 210g, 210i, 210j, and 210l at a radial distance $R_1$ from the central ring 206. It should be apparent, that the radial distances may be radially measured from the turbine casing 204, the center of the shaft 102, or any other suitable common frame of reference. Further, as shown in FIG. 3, the predetermined distance from the central ring 206 that a particular temperature sensor is disposed on a corresponding sensor holder may be selected randomly. Alternately, such distance may alternate between adjacent sensors, so for example, the sensor 210a may be disposed at the distance $R_0$, the sensor 210b may be disposed at the distance $R_1$, the sensor 210c may be disposed at the distance $R_0$, and so on.

Although FIG. 3 shows the temperature sensors 210 disposed at one of two distances $R_0$ and $R_1$, it should be apparent that these sensors 210 may be disposed at additional distances as appropriate for the engine design.

Figure 4:
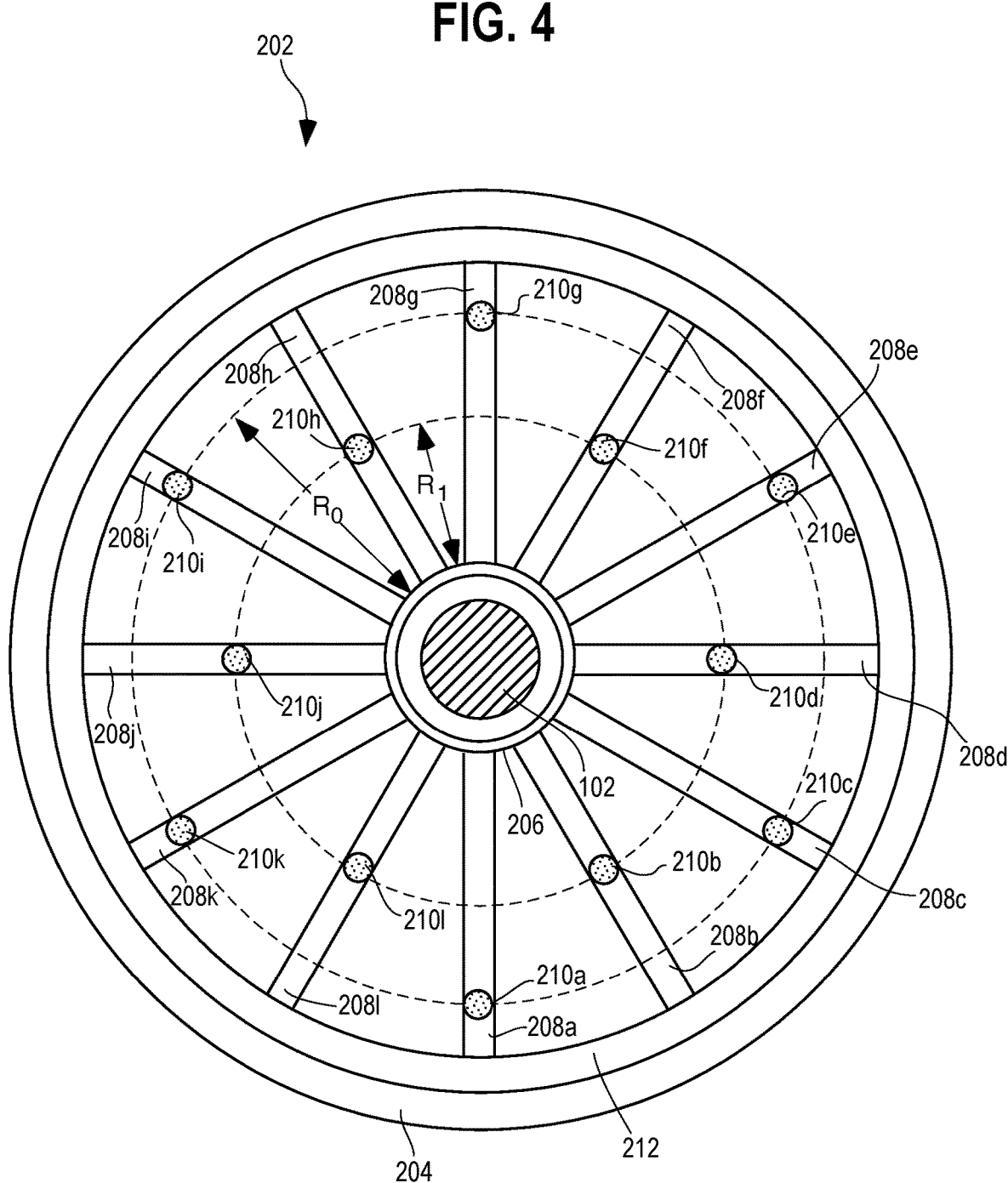
FIG. 4 is a cross-sectional view of portions of another embodiment of a temperature sensing device of FIG. 2 taken along the line 3-3 of FIG. 2 and that shows an arrangement of sensor holders and temperature sensors that comprises such temperature sensing device.

Referring to FIG. 4, in another embodiment of the temperature sensing device 202, the sensor holders 208 are secured to the central ring 206 and an outer ring 212. The outer ring 212 is secured to the casing 204 of the turbine 110. The temperature sensors 210 are disposed on the sensor holders 208 as described above.

Figure 5:
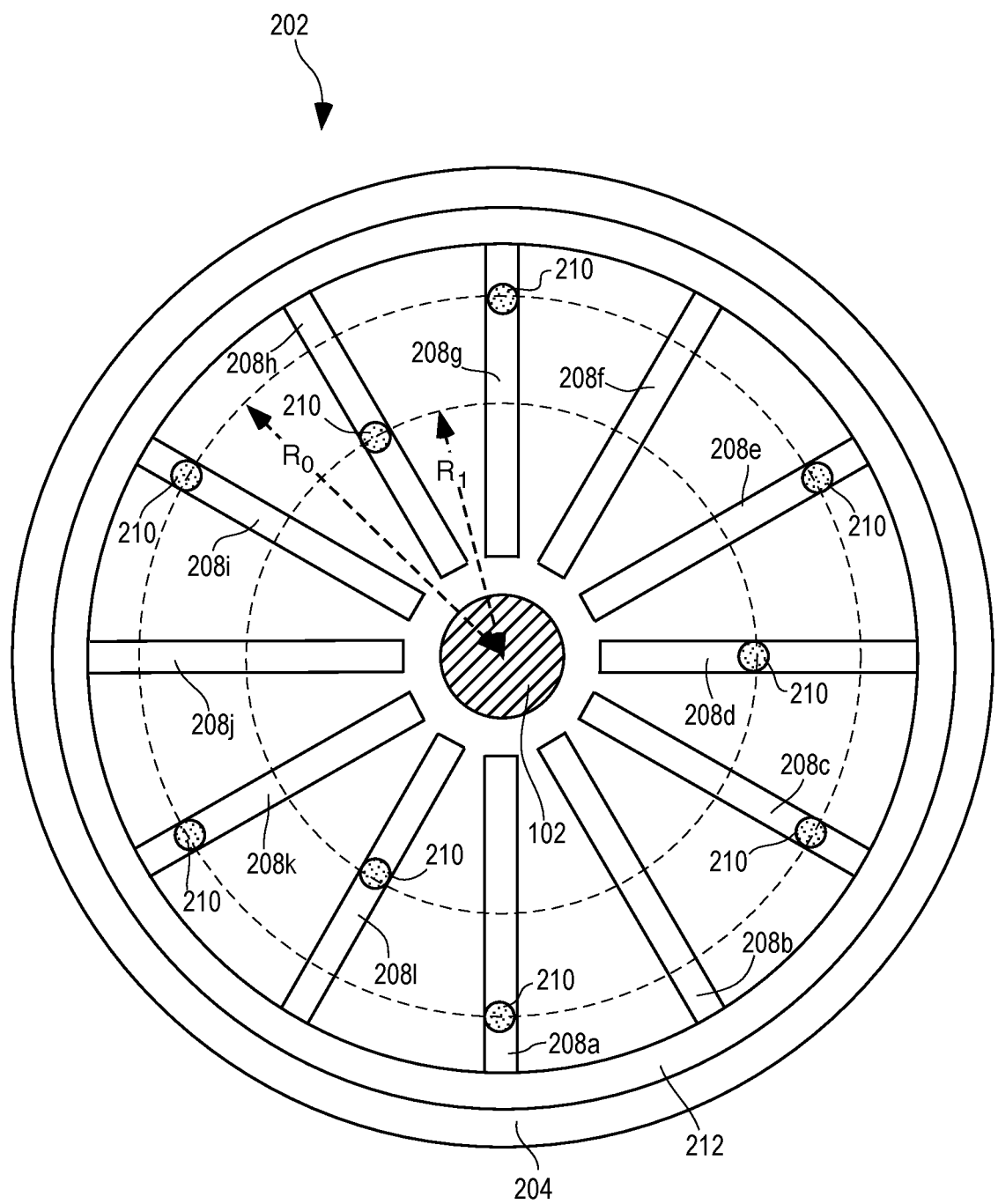
FIG. 5 is a cross-sectional view of portions of a further embodiment of a temperature sensing device of FIG. 2 taken along the line 3-3 of FIG. 2 and that shows an arrangement of sensor holders and temperature sensors that comprises such temperature sensing device.

Referring to FIG. 5, in still another embodiment of the temperature sensing device 202, the sensor holders 208 are secured to and cantilevered from the outer ring 212. In this embodiment, the central ring 206 is not necessary. This embodiment also includes temperature sensors 210 on sensor holders 208a, 208c, 208d, 208e, 208g, 208h, 208i, 208k, and 208l. The sensor holders 208b, 208f, and 208j are free of any temperature sensors.

It should be apparent that the features shown in FIGS. 3-5 may be selected and combined to develop other embodiments of the temperature sensing device 202.

Having the temperature sensors 210 disposed at different distances from the central ring 102 (and, therefore, the shaft 102) rather than at identical distances from the shaft 102 enables the controller to develop a more accurate estimate of the temperature of the combustion gasses passing through the turbine 110 under different operating conditions of the engine.

In some embodiments, the various distances at which the temperature sensors 210 are disposed is determined by analyzing a profile developed during testing of the engine using temperature rakes as described above. The profile may indicate how temperature varies in accordance with radial distance for different operating conditions of the engine.

Referring to FIG. 4, a first curve 250 shows how measured temperature varies with radial distance when the engine is operated under a first condition, and a second curve 252 shows how the measured temperature varies with radial distance when the engine is operated under a second condition. The radial distances $R_0$ and $R_1$ may be selected, for example, in accordance with a radial distance at which the measured temperature is highest, as shown by the peaks 254 and 256 of the profile curves 250 and 252, respectively. Alternately, such radial distances $R_0$ and $R_1$ may be selected in accordance with the radial distances at which the average temperatures associated with the profile curves 250 and 252 can be measured. Other ways of selecting radial distances at which to dispose the temperature sensors 210 in accordance with temperature profiles apparent to those who have skill may be used.

INDUSTRIAL APPLICABILITY

As should be apparent from the forgoing, the turbine temperature sensing device 202 in which temperature sensors 210 are at different radial distances provides an engine controller additional information regarding how the engine 100 is operating compared to one in which all of the temperature sensors 210 are at an identical radial distance. Further, such temperature sensing device 202 may be more economical than using a rake or distributing multiple temperature sensors on each sensor holder 208.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. A temperature sensing device for measuring temperature in a turbine of an engine, wherein the turbine is downstream of a combustor and includes first and second turbine stages coupled to a rotatable shaft and an outer casing, comprising:
   first and second sensor holders disposed between the rotatable shaft and the outer casing;
   a first temperature sensor disposed on the first sensor holder at a first radial distance from the rotatable shaft; and
   a second temperature sensor disposed on the second sensor holder at a second radial distance from the rotatable shaft;
   wherein each of the first and second sensor holders has only one temperature sensor disposed thereon, and the first and second distances are different, and wherein the temperature sensing device is disposed between the first and second turbine stages.

2. The temperature sensing device of claim 1, including a third sensor holder disposed between the rotatable shaft and the outer casing, wherein the third sensor holder is free of a temperature sensor.

3. The temperature sensing device of claim 1, further including a ring that encircles the rotatable shaft, and the first and second sensor holders are secured to the ring.

4. The temperature sensing device of claim 3, wherein first and second sensor holders are secured to the casing.

5. The temperature sensing device of claim 1, further including a first ring secured to the outer casing and encircling the rotatable shaft, and the first and second sensor holders are secured to the first ring.

6. The temperature sensing device of claim 5, further including a second ring that encircles the rotatable shaft and disposed between the first ring and the rotatable shaft, and the first and second sensor holders are secured to second ring.

7. The temperature sensing device of claim 1, wherein the first turbine stage is a turbine stage of the turbine closest to the combustor and the second turbine stage is a turbine stage of the turbine closest to the first turbine stage.

8. The temperature sensing device of claim 1 in combination with a controller, wherein the controller adjusts operation of the engine in accordance with temperature measurements made by the first temperature sensor and the second temperature sensor.

9. A method of measuring temperatures in a turbine of an engine, wherein the turbine includes first and second turbine stages coupled to a rotatable shaft and an outer casing, comprising the steps of:
 disposing first and second sensor holders between the rotatable shaft and the outer casing;
 disposing only a first temperature sensor on the first sensor holder at a first distance from the rotatable shaft; and
 disposing only a second temperature sensor on the second sensor holder at a second distance from the rotatable shaft;
 wherein the first and second distances are different and the first and second sensor holders are disposed between the first and second turbine stages.

10. The method of claim 9, including disposing a third sensor holder between the rotatable shaft and the outer casing, wherein the third sensor holder is free of a temperature sensor.

11. The method of claim 9, including disposing a ring that encircles the rotatable shaft between the rotatable shaft and the outer casing, wherein disposing the first and the second sensor holders includes securing the first and second sensor holders to the ring.

12. The method of claim 11, wherein disposing the first and the second sensor holders includes securing first and second sensor holders to the outer casing.

13. The method of claim 9, wherein disposing the first and the second sensor holders includes securing the first and the second sensor holders to the outer casing such that the first and second sensor holders are cantilevered therefrom.

14. The method of claim 9, further including securing a first ring to the outer casing such that the first ring encircles the rotatable shaft, and wherein disposing the first and second sensor holders includes securing the first and second sensor holders to the first ring.

15. The method of claim 14, further including disposing a second ring between the first ring and the shaft such that the second ring encircles the rotatable shaft, and wherein disposing the first and second sensor holders includes securing the first and second sensor holders to the second ring.

16. The method of claim 9, wherein the first turbine stage is a turbine stage of the turbine closest to the combustor, and the second turbine stage is a turbine stage of the turbine closest to the first turbine stage.

17. The method of claim 9, further including adjusting operation of the engine in accordance with temperature measurements made by the first temperature sensor and the second temperature sensor.

18. A temperature sensing device for measuring temperature in a turbine of an engine, wherein the turbine includes a turbine stage coupled to a rotatable shaft and an outer casing, comprising:
 first and second sensor holders disposed between the rotatable shaft and the outer casing;
 a first temperature sensor disposed on the first sensor holder at a first radial distance from the rotatable shaft; and
 a second temperature sensor disposed on the second sensor holder at a second radial distance from the rotatable shaft;
 wherein each of the first and second sensor holders has only one temperature sensor disposed thereon, and the first and second distances are different; and
 wherein the first and second sensor holders are cantilevered from the outer casing.

\* \* \* \* \*